UNITED STATES PATENT OFFICE.

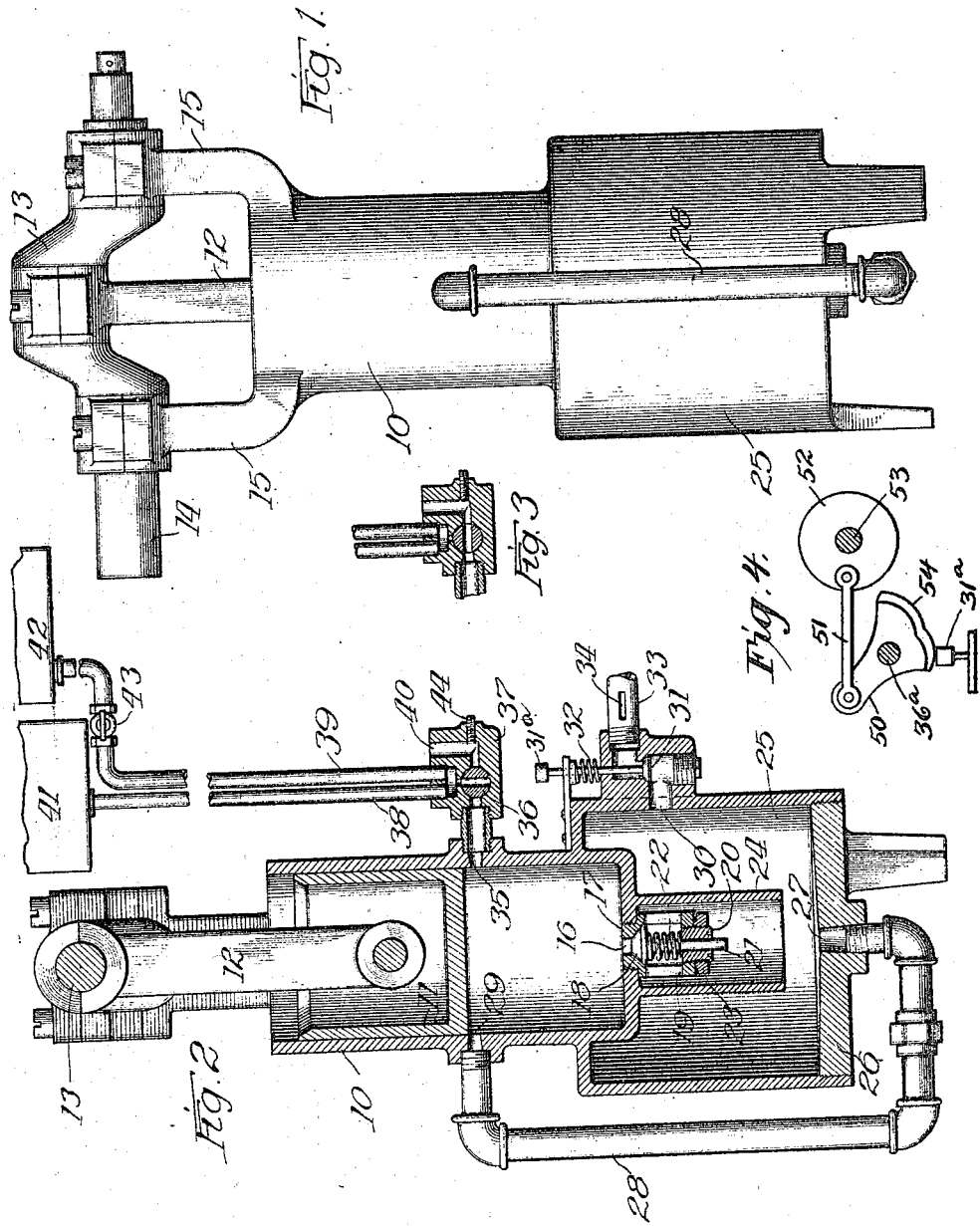

NILS EMEL NORSTROM, OF CHICAGO, ILLINOIS.

CARBURETER.

1,236,205.  Specification of Letters Patent.  Patented Aug. 7, 1917.

Application filed November 7, 1913. Serial No. 799,660.

*To all whom it may concern:*

Be it known that I, NILS EMEL NORSTROM, a citizen of the United States of America, and a resident of Chicago, county of Cook, and State of Illinois, have invented certain new and useful Improvements in Carbureters, of which the following is a specification.

My invention relates to carbureters and has for its object improvements in devices of that kind.

Hydrocarbons such as kerosene are liquid at ordinary pressures and temperatures. They may be vaporized by raising the temperature without raising the pressure, or by reducing the pressure without greatly raising the temperature. If the pressure and temperature increase or decrease together, then the hydrocarbon will remain liquid under ordinary conditions.

When a gas is compressed mechanically it will rise in temperature in a definite relationship to the amount of work absorbed in compressing it. If the compressed gas is permitted to expand, and in expanding is permitted to perform an amount of work equal to that consumed in compressing it, then the temperature of the gas will fall to that at which it existed before being compressed. If, however, gas which has been heated by being compressed is permitted to expand into a vacuum it performs no work and consequently loses no temperature, or only a very small amount. The energy stored in the gas by compressing it still remains there in the form of heat after the pressure is relieved. Similarly, if a gas which has been heated to a high temperature by being compressed, is permitted to expand quickly into a relative vacuum, that is into another body of gas at a much lower pressure, it will not perform, in so expanding, an amount of work equal to that required to do the compressing, and consequently will retain, in its expanded form, a very considerable portion of the temperature it acquired on being compressed. If such expanded and highly heated gas be brought into intimate contact with finely divided kerosene, or other liquid hydrocarbon which is volatile at the pressure and temperature of the gas, then this hydrocarbon will become vaporized.

The present device is designed to compress air to a high pressure and temperature and then to expand the air into a low pressure chamber so that it will not perform an amount of work equal to that consumed in compressing it. The liquid hydrocarbon is maintained in contact with the air in the operations of both compressing and expanding it.

In the accompanying drawings—

Figure 1 is an elevation;

Fig. 2 is a sectional elevation at right angles to the view of Fig. 1;

Fig. 3 is a detail showing the oil inlet valve in a different position from that shown in Fig. 2 and Fig. 4 is a detail showing connections for operating the valves.

In the said drawings the cylinder 10 is provided with a piston 11, which is connected by the connecting rod 12 with a crank 13. The crank 13 forms part of a shaft 14 supported in arms 15 on the cylinder 10. The pump, consisting of the cylinder 10 and the piston 11, may be driven from the engine by a chain extending to a sprocket wheel on the end of the shaft 14, or in any other convenient manner. This chain drive is not shown as it forms no part of the present invention and may be the same as any chain drive.

The pump discharges at its bottom through an opening 16 in a bushing 17, which opening is closed by a valve 18. The bushing 17 is screwed into the bottom of the cylinder 10 and forms part of a frame 19. A bushing 20 is screwed into the lower part of the frame 19 and serves as a guide for the stem 21 of the valve 18. A spring 22 between the bushing 20 and the valve 18 serves to hold the valve to its seat with considerable force. Adjustment of the bushing 20 serves to adjust the tension of the spring 22, and the lock nut 23 serves to hold such adjustment.

The frame 19 and associated parts are inclosed by a shell or casing 24 which is open at its bottom, and this casing is located within a chamber 25. The chamber 25 is closed by a plug 26 having a discharge opening 27. A pipe 28 connects the opening 27 with an opening 29 in the cylinder 10 just below the piston 11 at its extreme upper position.

The chamber 25 has a second discharge opening 30 having a valve 31 normally held in a closed position by a spring 32. When the valve 31 is open the port or opening 30 communicates with a pipe 33 leading to the manifold of the engine. An opening 34 in the pipe 33 admits air either to the manifold or to the chamber 25 as the case may be.

In the wall of the cylinder 10 is a second port 35 which communicates with a 3-way valve 36 in the valve casing 37. Also communicating with the valve 36 are two pipes 38 and 39, and an air inlet 40. The pipe 38 connects to an elevated reservoir 41 for kerosene or other heavy hydrocarbon, and the pipe 39 connects to another elevated reservoir 42 for gasolene or other light hydrocarbon. The reservoir 42 is at a greater elevation than the reservoir 41 so that when the normally closed valve 43 in the pipe 39 is opened, the head of the gasolene will be sufficient to force back the kerosene in pipe 38 and only gasolene will be delivered to the valve 36. An adjustable screw 44 in the valve casing 37 serves to regulate the amount of air that may be admitted to the valve 36.

The valves 31 and 36 are connected, either directly or indirectly, with the intake valve of the engine so that all of these valves will open and close simultaneously. A convenient connection for this purpose is shown in Fig. 4. On the stem 36ª of the valve 36 is a rock arm 50 connected by a link 51 to a crank 52 on the shaft 53. The shaft 53 is driven from the engine shaft in any convenient manner. On the lower end of the rock arm 50 is a cam 54 which projects over the head 31ª of the valve 31. By the time the crank 52 has made a half revolution from the position shown in Fig. 4, the valve 36 will be moved from the position shown in Fig. 2 to that shown in Fig. 3. In this movement the cam 54 engages head 31ª to open valve 31. The valve 31, in addition to being definitely opened by suitable connections at the time the engine valve opens, may open by compression of spring 32 at any time when the pressure in the chamber 25 is less than atmospheric pressure at the opening 34 in the pipe 33. In such cases air flows inward past the valve 31.

In operation the pump preferably makes from two to four compression strokes for each explosion of the engine. Assuming the pump piston 11 to be at its upper position as shown in Fig. 2 and the space below the piston to be filled with air, and also assuming that there is a small amount of kerosene in the cylinder either mixed with the air in the form of spray or lying on the bottom of the cylinder, then, as the piston descends the air under it will be compressed and heated. The oil in the cylinder will not be vaporized by the high temperature of the air as long as it is in the cylinder because the corresponding pressure restrains the vaporization which would occur if the pressure were lower. But when the valve 18 opens under the increasing pressure the air in the cylinder will escape into a chamber having air at a much lower pressure, and because the air flowing from the cylinder moves into a relative vacuum it will not perform as much work as was expended in compressing it, and consequently it will lose only a relatively small part of its high temperature. The immediate result is to have air at high temperature and low pressure in contact with the oil, and the secondary result is that the oil will become vaporized by absorbing part of the heat in the air. The sensible heat in the air is absorbed as latent heat of vaporization in the oil.

The temperature which is obtained at the instant of air discharge from the cylinder is, of course, determined by the adjustment of the bushing 20 to vary the tension of the spring 22, and may be anything desired. The port 16, the valve 18 and the spring 22 are so proportioned to each other as to cause the actual valve opening to be very small. The object of this is to cause an intimate contact between the heated air and the oil the instant of air expansion. If the oil is in the form of a spray in the air this intimate contact is assured without special provision. But part of the oil is in the form of a film on the surface of the metal and is carried along by the air flowing over it. By having the space small between the valve 18 and its seat when the air is flowing through, the contact between the oil and the air is better than when the space is large.

The shell 24 discharges downward toward the bottom of the chamber 25. Vapor rises to the upper part of the chamber 25 while unvaporized oil strikes the bottom 26 near the port 27 or consists of minute drops suspended in the air at the lower part of the chamber. In descending the piston 11 comes very close to the bottom of the cylinder and expels all but a very small part of the air therein. In rising the piston creates a partial vacuum by reason of the valve 18 closing instantly upon relief of the pressure above it. During the brief period in which the piston is at and near its highest point the port 29 is opened and air and unvaporized oil flow htrough the pipe 28 to the cylinder. Because the pressure within the cylinder at this time is a relative vacuum as compared to the pressure in the chamber 25, the air flowing through the pipe 28 to the cylinder is expanded without doing mechanical work corresponding to the amount of work necessary to do a corresponding amount of compression. This extra work is absorbed in adding temperature to the air, and is later absorbed in the vaporization of the oil in contact with the air. When the piston again descends it again compresses the air and forces it into the chamber 25, from which it is again drawn by the piston uncovering the port 29. In each round of the air from the cylinder to the chamber and back to the cylinder, energy is absorbed, through the intervention of the air, in the work of vaporizing the oil as distinguished from mechanically dividing it into small globules.

Periodically, as once in every second or fourth upward stroke of the piston, the valve 36 is moved from the position shown in Fig. 2 to that shown in Fig. 3. At this time, when the piston uncovers the port 35, air enters the opening 40 and drives ahead of it into the cylinder whatever oil may be in the central channel of the valve 36. The port 35 is preferably a little lower than port 29 so that the inflow of fresh oil and air will have a slight lead over inflow through port 29 from chamber 25. When the piston again descends it drives the fresh oil and air through the course previously described. At a point of time prior to the piston again uncovering the port 35, the valve 36 is returned to the position shown in Fig. 2, and oil flows from the reservoir 41 through the pipe 38 to again fill the channel in the valve 36.

As previously stated, the opening in the valve 36 to an inward flow of air is simultaneous with the opening of the intake valve of the engine and the opening of the valve 31. The simultaneous opening of the engine valve and valve 31 permits the engine to draw vapor from the upper part of the chamber 25 through port 30 and pipe 33. Outside air also flows through port 34 and mixes with the vapor flowing to the engine. The suction of the engine in taking in a charge produces a partial vacuum in the chamber 25, so that when the piston opens the port 29 immediately after opening the port 35, there is little or no flow through the pipe 28 to the cylinder. In other words, at the instant when the engine is drawing a charge of mixed air and vapor from the chamber 25, the pump piston is drawing in a fresh supply of oil and air through the port 35. This fresh supply is worked over two or more times in the manner described, and is then delivered as a new charge to the engine.

The valve 31 opens inward and is closed by the spring 32. It is so connected up that it may open of itself at any time when the pressure in the chamber 25 is less than that of the outside air. Immediately after the closure of the intake valve of the engine, and before discharge from the cylinder, the pressure in the chamber 25 is below atmospheric pressure, and a small amount of air flows inward through the opening 34, past valve 31, and through port 30 o the chamber 25. This inward flow is checked as soon as discharge from cylinder to chamber begins.

What I claim is:

1. In a carbureter, a compressor provided with a charge of air and oil, a chamber into which compressed air and oil is discharged from the compressor and in which the compressed air is expanded, means by which oil and expanded air in the chamber are drawn again into the compressor to be there compressed again and again expanded in the chamber, and connections by which the oil and the repeatedly compressed and expanded air are conveyed to an engine.

2. In a carbureter, means for successively compressing and expanding a body of air a plurality of times in contact with a charge of oil, a cylinder within which compression takes place, a chamber for the expansion, and means for conveying the repeatedly compressed and expanded air to an engine.

3. In a carbureter, a cylinder within which a charge of air is compressed in contact with a charge of oil, a chamber within which the compressed air may be expanded, a passageway connecting the cylinder and chamber, a valve closing said passageway and adapted to be opened by the pressure in the cylinder, adjustable devices for varying the pressure at which the valve will open to permit escape of the air from the cylinder to the chamber, and a return passageway for conveying the expanded air to the cylinder.

4. In a carbureter, a cylinder within which a charge of air may be compressed in contact with a charge of oil, a reciprocating piston for so compressing it, a chamber within which the compressed air may expand, a passageway connecting the cylinder and the chamber, a spring actuated valve normally closing said passageway and adapted to be opened by pressure in the cylinder, and a return passageway from the chamber to the cylinder, said return passageway being opened by the piston on its return reciprocation after compressing the air in the cylinder.

5. In a carbureter, a cylinder within which air may be compressed in contact with a charge of oil, a chamber within which the compressed air is expanded and into which the oil is conveyed at the time of such expansion, an interior casing for guiding the unvaporized oil to the lower part of the chamber, and a return passageway connecting the lower part of the chamber with the upper part of the compression space within the cylinder.

6. In a carbureter, devices for successively compressing and expanding a charge of air in contact with a charge of oil, means for conveying the air and vaporized oil to an engine after a plurality of compressions and expansions, and means for supplying said devices with a fresh charge of air and oil simultaneously with the conveyance of air and vapor to the engine.

7. In a carbureter, devices for compressing and expanding a charge of air a plurality of times in contact with a charge of oil, a relief valve for permitting additional air to enter said devices during expansion, means for conveying the air and vaporized oil from said devices to an engine, and means for supplying said devices with a fresh charge of air simultaneously with the conveyance of air and vapor to the engine.

8. In a carbureter, a compressor and an expanding chamber for compressing and expanding a charge of air a plurality of times in contact with a charge of oil, means for conveying the air and vaporized oil from the chamber to an engine after a plurality of compressions and expansions, and means for supplying the compressor with a fresh charge of air and oil simultaneously with the conveyance of air and vapor to the engine.

9. In a carbureter, a compressor and an expanding chamber for compressing and expanding a charge of air a plurality of times in contact with a charge of oil, means for conveying air and vapor from the chamber to an engine, means for supplying the compressor with a fresh charge of air and oil, and means for regulating the supply of air to the compressor.

Signed at Chicago, Illinois, this 5th day of November, 1913.

NILS EMEL NORSTROM.

Witnesses:
C. L. REDFIELD,
WALTER H. REDFIELD.